(12) United States Patent
Kozyrev et al.

(10) Patent No.: US 11,293,077 B2
(45) Date of Patent: Apr. 5, 2022

(54) METHOD FOR RECOVERING SCANDIUM FROM RED MUD LEFT FROM ALUMINA PRODUCTION

(71) Applicant: United Company RUSAL Eng, and Tech. Centre LLC, Krasnoyarsk (RU)

(72) Inventors: Aleksandr Borisovich Kozyrev, Krasnoyarsk (RU); Ol'ga Viktorovna Petrakova, Krasnoyarsk (RU); Aleksandr Gennadievich Suss, Krasnoyarsk (RU); Sergej Nikolaevich Gorbachev, Krasnoyarsk (RU); Andrej Vladimirovich Panov, Krasnoyarsk (RU)

(73) Assignee: United Company RUSAL Eng. and Tech. Centre LLC, Krasnoyarsk (RU)

( * ) Notice: Subject to any disclaimer, the term of this patent is extended or adjusted under 35 U.S.C. 154(b) by 247 days.

(21) Appl. No.: 16/478,089

(22) PCT Filed: Jun. 21, 2017

(86) PCT No.: PCT/RU2017/000438
§ 371 (c)(1),
(2) Date: Jul. 15, 2019

(87) PCT Pub. No.: WO2018/236240
PCT Pub. Date: Dec. 27, 2018

(65) Prior Publication Data
US 2019/0360073 A1    Nov. 28, 2019

(51) Int. Cl.
| | |
|---|---|
| *C22B 59/00* | (2006.01) |
| *C22B 1/00* | (2006.01) |
| *C22B 3/12* | (2006.01) |
| *C22B 3/24* | (2006.01) |
| *C22B 3/42* | (2006.01) |
| *C22B 7/00* | (2006.01) |

(52) U.S. Cl.
CPC .............. *C22B 59/00* (2013.01); *C22B 1/00* (2013.01); *C22B 3/12* (2013.01); *C22B 3/24* (2013.01); *C22B 3/42* (2013.01); *C22B 7/008* (2013.01)

(58) Field of Classification Search
CPC .. C22B 7/008; C22B 1/00; C22B 3/12; C22B 3/24; C22B 3/42; C22B 59/00
USPC ........................................................ 75/743
See application file for complete search history.

(56) References Cited

U.S. PATENT DOCUMENTS

2015/0307966 A1*  10/2015  Voight .................... B01J 19/24
                                                                423/21.5

FOREIGN PATENT DOCUMENTS

| RU | 2201988 C2 | * | 4/2003 |
| RU | 2247788 C1 | * | 3/2005 |
| RU | 2484162 C2 | * | 6/2013 |
| RU | 2562183 C1 | * | 9/2015 |

OTHER PUBLICATIONS

Skrjabneva et al., Method for Preparation of Scandium Oxide From Red Mud, Mar. 10, 2005, English machine translation of RU 2247788 C1 (Year: 2005).*
Panov et al., Method of Producing of Scandium Concentrate From Red Slime, Sep. 10, 2015, English machine translation of RU 2562183 C1 (Year: 2015).*
Poponin et al., Method of Extracting Rare-Earth Metals From Technological and Productive Solutions and Pulps, Jun. 10, 2013, English machine translation of RU 2484162 C2 (Year: 2013).*
Ustich et al., Method of Extraction of Scandium in Processing Bauxites for Alumina, Apr. 10, 2003, English machine translation of RU 2201988 C2 (Year: 2003).*

\* cited by examiner

*Primary Examiner* — Weiping Zhu
(74) *Attorney, Agent, or Firm* — Hogan Lovells US LLP

(57) ABSTRACT

The present invention relates to rare earth metallurgy, in particular a method for recovering scandium from the red mud byproduct of alumina production. The method includes repulping red mud, sorption leaching scandium therefrom with the use of an ion-exchange sorbing agent to obtain a rich-in-scandium ion exchanger and depleted-in-scandium pulp, desorbing scandium with a solution of sodium hydrocarbonate to obtain a desorbed ion exchanger which is returned to the sorption leaching stage and a solution of industrial reclaim scandium which is transferred to obtain a deposited concentrated scandium, wherein scandium is continuously sorption-leached from red mud pulp in the phosphorous-containing ion exchanger in a countercurrent mode upon direct contact of the pulp with the ion exchanger, scandium is desorbed from the organic phase of the ion exchanger by a solution with a concentration of $Na_2CO_3$ of 200-450 $g/dm^3$ to obtain industrial reclaim scandium, from which a scandium concentrate is recovered.

8 Claims, 1 Drawing Sheet

METHOD FOR RECOVERING SCANDIUM FROM RED MUD LEFT FROM ALUMINA PRODUCTION

CROSS REFERENCE TO RELATED APPLICATION

This application is a U.S. National Phase under 35 U.S.C. § 371 of International Application PCT/RU2017/000438, filed on Jun. 21, 2017, which is incorporated by reference in its entirety.

FIELD OF INVENTION

The present invention relates to metallurgy of rare earths, in particular to scandium recovery and concentration, and can be used in scandium production from red mud which is left as a byproduct of alumina production.

BACKGROUND

Scandium is a typical trace element and is rare in terms of commercially viable deposits, that is why it is produced as a byproduct of recovery from titanium-containing, uranium-containing, and other raw materials. Currently, there is an increasing interest in scandium as a component of aluminum alloys, zirconium ceramics, and materials for laser production. Aluminum alloys containing scandium represent a unique combination of technological characteristics, such as high strength, superplasticity, great weldability and high corrosion resistance. Zirconium ceramics stabilized by scandium oxide have the highest ionic conductivity if compared with analogs, thus enabling operation temperature reduction of an electrochemical device from 1000 to 700° C. and preserving at the same time high conductivity of a separating membrane; it contributes to increasing the service life and reliability of electrochemical reactors.

A known method for recovering scandium from red muds includes multiple successive leaching of red mud by a carbonate solution containing a mixture of 85-100 g/dm$^3$ of $NaHCO_3$ and 20.0-45.0 g/dm$^3$ of $Na_2CO_3$ or 125 g/dm$^3$ of $NaHCO_3$ by passing through a pulp a gas-air mixture containing $CO_2$ at the pressure of 3.0-6.0 atm in the vibrocavitation mode with the following two-stage holding of a pregnant solution at elevated temperatures: at the first stage—at the temperature no less than 90° C. and pH 9.0-9.5 during 3 hours followed by filtering out produced poorly soluble compounds of impurities; at the second stage—at the temperature of 100-110° C. during 3 hours with addition of a solution of sodium hydroxide with pH up to 12.5 in order to obtain a concentrated scandium deposit. According to this method, the degree of scandium recovery from red mud during carbonate leaching is 20%, and a concentration of scandium oxide in the resulted pregnant solution after five recycling stages is 26 mg/dm$^3$; the percentage of scandium oxide in the end product is 6.5% by weight (RU2562183, published on 10 Sep. 2015).

The drawback of the known method includes increased costs for process implementation caused by the need in multiple solution recirculations in order to leach new portions of red mud and to concentrate scandium resulting in a low-quality end product, thus, leading to additional costs at the stage of recleaning the concentrated scandium into scandium oxide.

Also, it is known a method for obtaining concentrated scandium from red muds, which includes initial vibrocavitation processing of slime pulp, successive carbonated leaching of red mud with carbonate solutions at the temperature of 55-65° C. and simultaneous aeration of the slime pulp with a gas-air mixture containing $CO_2$, filtrating the carbonated slime pulp to obtain a scandium-containing solution, concentrating scandium from the obtained solution by means of sorption in phosphate ion exchangers at the temperature of 70-80° C. with accompanying separation of impurities, pulse scandium desorbing from the organic phase of ion exchangers by mixed carbonate chloride solutions at the concentration of $Na_2CO_3$ 130-150 g/dm$^3$ and NaCl 40-60 g/dm$^3$ to obtain a scandium-containing eluate which is used for the stage of deposition of poorly soluble scandium compounds. Scandium is leached from red mud with the use of a solution of sodium hydrocarbonate ($NaHCO_3$) with a concentration of 100-150 g/dm$^3$ at the temperature of 55-65° C. for 4-6 hours having slime pulp pre-processed by means of vibrocavitation at stirring for 45-60 min at a rotation speed of 20-40 m/s. The carbonate solution resulted from the sorptive recovery of scandium can be returned in the process beginning to perform a further cycle of scandium carbonation and leaching from red mud. The scandium-containing eluate obtained after desorption can be returned to the desorption stage as many times as needed to obtain an equilibrium scandium concentration in the eluate. Impurities including titanium and zirconium are deposited from a scandium-containing eluate at the temperature of 80-90° C. and pH of 9.0-10.0 for 2-3 hours, poorly soluble scandium compounds are deposited from a purified eluate at pH values of 11.5-12.5 and at the temperature of 100-110° C. for 2-3 hours (RU2536714, published on 27 Dec. 2014). This method allows to obtain higher concentrations of a pregnant solution (~140 mg/dm$^3$ of $Sc_2O_3$) which helps to reduce product flows at the stage of deposition of impurities and scandium and to increase the scandium oxide content in a final product up to 24.5-27.8%. However, a degree of scandium recovery in the claimed method is still quite low (18-24%) while the costs connected with the process of scandium sorption from a solution are high due to the need to use large amounts of expensive phosphorous-containing ion exchangers.

The closest to the claimed method in terms of its technical features and effects is a method for recovering scandium from red mud which includes repulping of red mud in a solution of sulfuric acid with pH up to 1.3-1.7 to obtain a pulp with a solid/liquid ratio of 1:2-4; sorption leaching of scandium directly from red mud pulp by means of a phosphorus-containing sorbing agent API-21 or API-22 during 1-6 hours at the temperature of 20° C. having a sorbing agent to red mud pulp ratio of 1:20-50 to obtain a rich in scandium sorbing agent having 0.2-0.23 mg/g of $Sc_2O_3$ and a depleted in scandium pulp, wherein the rich in scandium sorbing agent is desorbed with a solution of $Na_2CO_3$ with the concentration of 150 g/dm$^3$ to obtain a desorbed sorbing agent that is returned to the stage of sorptive recovery of scandium and the scandium desorption solution having $Sc_2O_3$ of 68-72 mg/dm$^3$ which is transferred to obtain scandium oxide by means of precipitating and recovery refining techniques. Application of the ion exchange sorption of scandium directly from a pulp increases the degree of scandium recovery from red mud by several percents and is 28.6%. [Smirnov D. I., Molchanova T. V., Vodolazov L. I., Peganov V. A. "Sorptive recovery of rare earths, yttrium, and aluminum from red muds//Non-ferrous metals, 8, 2002, pages 64-69].

The major drawback of this known method includes quite low scandium recovery degree and high material costs for method arrangement connected with the use of acidic solutions at the leaching and sorption stage which results in adding the stage of neutralization of leached red mud and, consequently, in industrial wastes, thorough washing of ion exchange resin after sorption and desorption processes, and in applying the technological process with the use of expensive acid-resistant equipment.

SUMMARY OF THE INVENTION

The present invention is based on the need to develop a new method for recovering scandium from red mud left from alumina production, with improved process performance provided by improving the degree of scandium recovery during the continuous sorption leaching of scandium from a red mud pulp at an elevated temperature in a countercurrent mode by shifting a reaction equilibrium towards formation of soluble scandium complex compounds with carbonate ions and its transformation into a solution due to the continuous reduction of scandium concentration in the solution in the result of its sorption in a phosphorous-containing ion exchanger.

The technical effect of the invention is to solve the mentioned problem, to improve the degree of scandium recovery from red mud and to improve the quality of an industrial reclaim of scandium together with the reduction of process costs. To this end, no acidic reagents are used which makes it possible to simplify the process flow and to reduce costs for process implementation by excluding stages of neutralization of leached red mud, washing out an acid from an ion exchanger and disposing of acidic wash-offs.

Said technical effect is achieved by that the inventive method for recovering scandium from red muds which includes repulping of red mud; sorption leaching of scandium from a red mud pulp using an ion-exchange sorbing agent (an ion exchanger) to obtain a rich in scandium ion exchanger and a depleted in scandium pulp; desorbing scandium with a solution of sodium hydrocarbonate to obtain a desorbed ion exchanger which is returned to the stage of sorption leaching of scandium and a solution of industrial reclaim scandium which is transferred to obtain a concentrated scandium, the red mud is repulped with a use of a solution having a mixture of sodium carbonate and sodium bicarbonate with a $Na_2O$total concentration of 40-80 g/dm$^3$, wherein the percentage of $Na_2O$bicarb is of 50 to 100% of $Na_2O$total, scandium is continuously sorbed in a phosphorous-containing ion exchanger at the temperature of 40-90° C. in a countercurrent mode on a direct contact "pulp-ion exchanger" and with a solid/liquid ratio of 1:2.5-5.0, scandium is desorbed from the organic phase of the ion exchanger by means of a concentrated solution of sodium hydrocarbonate with a concentration of $Na_2CO_3$ from 200 to 450 g/dm$^3$ to obtain an industrial scandium reclaim from which a scandium concentrate is recovered.

BRIEF DESCRIPTION OF THE DRAWING

The present invention will be further described in the detailed description with reference to the accompanying drawing, which is given by way of illustration only, and thus, does not limit the present invention.

DETAILED DESCRIPTION OF THE INVENTION

Figure 1:
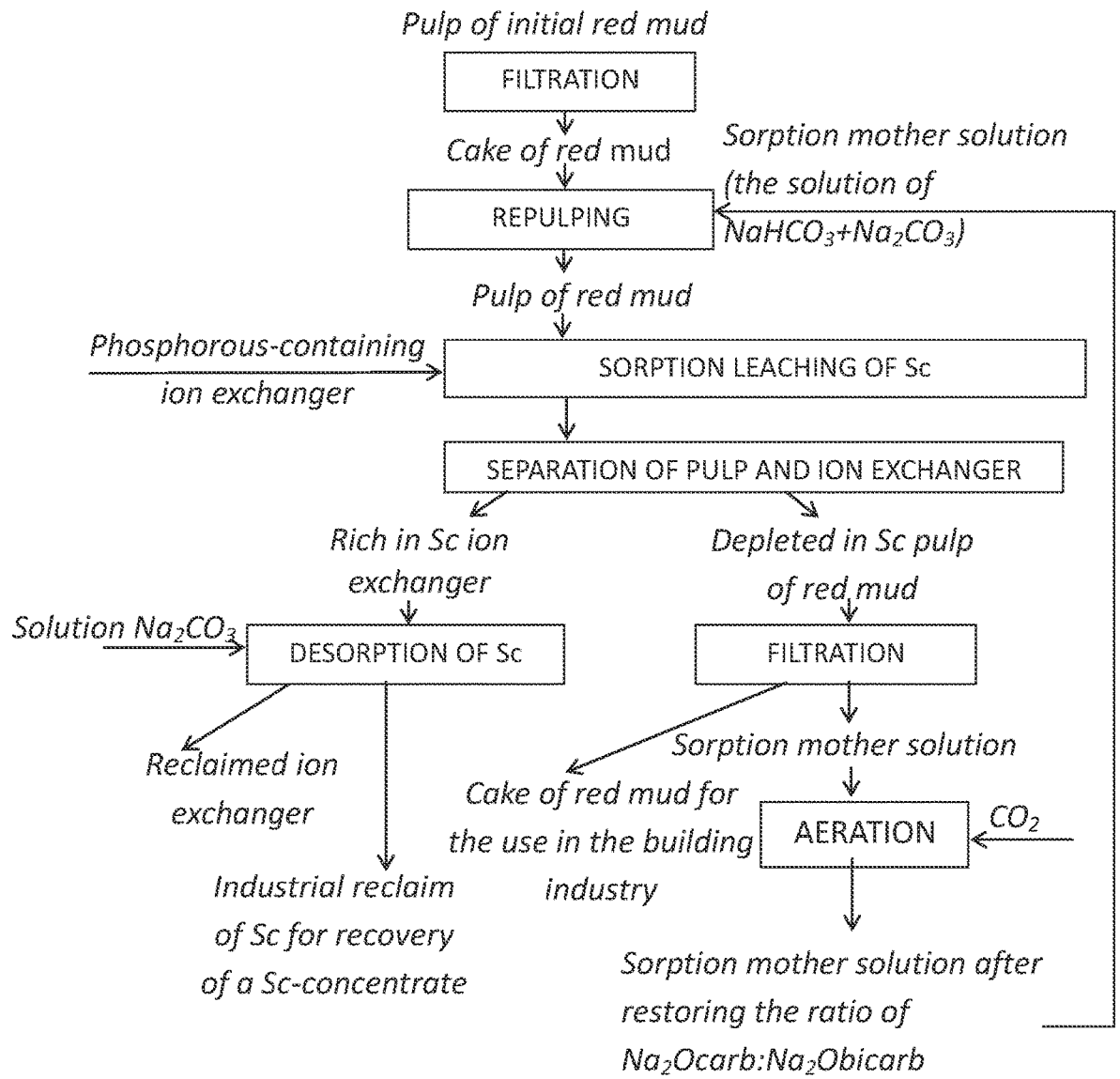
FIG. 1 a shows a process flow scheme for scandium recovery from red mud.

It is desired to optimize suggested method by following:

Scandium is sorbed at each stage during 1-8 hours at a mass ratio of pulp to ion exchanger of 20-130:1. After sorption, the red mud pulp depleted in scandium is transferred to the filtration stage, the resulted solution of the mixture of sodium carbonate and sodium bicarbonate is aerated at the temperature of 15-50° C. with a gas-air mixture containing $CO_2$ until the percentage of $Na_2O$bicarb of $Na_2O$total is 50-100% and then is returned for sorption leaching of a new red mud portion.

When scandium is sorbed from the pulp in the phosphorous-containing ion exchanger, the pulp is aerated with a gas-air mixture containing $CO_2$.

Due to the recovery of scandium from red mud by means of sorption leaching in a phosphorous-containing ion exchanger on a continuous contact of the ion exchanger with the red mud pulp in a countercurrent mode and at an elevated temperature at which sodium bicarbonate is decomposed to form an ultradispersed carbon dioxide, the degree of scandium recovery from red mud is increased by means of a shift of a reaction equilibrium towards formation of soluble scandium complex compounds with carbonate ions and its transformation into a solution due to the continuous reduction of scandium concentration in the solution in the result of its sorption in a phosphorous-containing ion exchanger having under optimal process conditions the higher scandium capacity.

Scandium desorption from a saturated phosphorous-containing ion exchanger by means of a carbonate solution under optimal parameters of desorption allows to provide an industrial scandium reclaim having an increased content of scandium oxide and to further recover therefrom a concentrated scandium having an increased scandium content.

Sorption leaching of scandium enables to reduce ion exchanger loading if compared with the scandium sorption from solutions in a compressed layer of the ion exchanger, thus, reducing process costs. This process is connected with the use of carbonate-containing reagents and doesn't make use of any acidic reagents which makes it possible to simplify the process flow and to reduce costs for process implementation by excluding stages of neutralization of a leached red mud, washing out an acid from an ion exchanger and disposing of acidic wash-offs.

Carrying out the scandium sorption leaching from red mud in a continuous countercurrent mode by means of a solution having a mixture of sodium carbonate and sodium bicarbonate with a concentration of $Na_2O$total of 40-80 g/dm$^3$, wherein the percentage of $Na_2O$bicarb is from 50 to 100% of $Na_2O$total, the temperature is 40-90° C., a liquid/solid ratio is 1:2.5-5 and a mass ratio of pulp to ion exchanger is 20-130:1 makes it possible to achieve the highest degree of scandium recovery from red mud and to concentrate it in the phosphorous-containing ion exchanger with optimal reagent consumption.

Carrying out the scandium desorption in a phosphorous-containing ion exchanger by means of a solution of sodium hydrocarbonate with a concentration of $Na_2CO_3$ from 200 to 450 g/dm$^3$ makes it possible to achieve the highest degree of reclaiming of the ion exchanger with the maximum scandium content in the industrial reclaim which is transferred for concentrated scandium recovery.

Aeration of a solution of a sodium carbonate and sodium bicarbonate mixture after scandium sorption leaching (a sorption mother solution) by means of a gas-air mixture at a temperature of 15-50° C. containing $CO_2$ enables restoring of the relationship of $Na_2O$bicarb and $Na_2O$total up to 50-100% at minimum $CO_2$ consumption rate and using the sorption mother solution for repulping a new red mud portion, thus, minimizing sodium carbonate and sodium bicarbonate consumption for the process implementation, as well as preventing losses of scandium and sorption mother solution.

Optimal parameters of the sorption leaching process have been found from numerous experiments by varying concentrations of carbonate and sodium bicarbonate in the solution, contact time of the pulp with a resin, the pulp temperature, the solid/liquid ratio, and the mass ratio of pulp to ion exchanger. When the sorption process was carried out in the time interval of interest, the pulp was separated from the ion exchanger on a sieve; the ion exchanger was washed with distilled water and selected for analysis. The pulp was filtered after sorption and the filtrate sample was taken. The deposit was washed out from the sorption mother solution and was taken, too, for analysis.

Table 1 shows results of experiments studying the impact of the concentration of $Na_2O$total in a carbonate-bicarbonate solution for leaching and the content of $Na_2O$bicarb therein on the degree of scandium recovery from red mud where at the first stage of sorption leaching the temperature is 60° C. the solid/liquid ratio is 1:4, the mass ratio of pulp to ion exchanger is 90:1 and the contact time is 2 hours.

TABLE 1

| No. | $Na_2O$total, g/dm³ | $Na_2O$bicarb/ $Na_2O$total, % | Recovery degree of Sc at the stage of sorption leaching, % |
|---|---|---|---|
| 1 | 40 | 100 | 25.3 |
| 2 |  | 50 | 23.8 |
| 3 |  | 25 | 21.2 |
| 4 | 50 | 100 | 29.1 |
| 5 |  | 50 | 26.6 |
| 6 |  | 25 | 24.3 |
| 7 | 55 | 100 | 39.4 |
| 8 |  | 50 | 37.1 |
| 9 |  | 25 | 31.9 |
| 10 | 65 | 100 | 47.8 |
| 11 |  | 50 | 42.4 |
| 12 |  | 25 | 39.3 |
| 13 | 75 | 70 | 33.1 |
| 14 |  | 50 | 30.9 |
| 15 |  | 25 | 25.2 |
| 16 | 80 | 70 | 23.2 |
| 17 |  | 50 | 21.3 |
| 18 |  | 25 | 18.4 |

Numbers of the Table 1 show that with increase of the concentration of $Na_2O$total in the carbonate-bicarbonate solution of red mud in the presence of the ion exchanger and with increase of the sodium bicarbonate content therein as well, the scandium recovery degree also increases, and at 65 g/dm³ of $Na_2O$total (100% $Na_2O$bicarb) reaches 47.8%. When concentration of $Na_2O$total becomes lower than 55 g/dm³, the degree of scandium recovery is reduced by reducing the amount of a leaching agent in the reaction zone, wherein the more $Na_2O$bicarb in relation to $Na_2O$total in the solution of the sodium carbonate and sodium bicarbonate mixture, the more efficient the leaching process is, because the thermal decomposition of sodium bicarbonate produces an ultradispersed carbon dioxide which intensifies the process of scandium transition into a solution to form carbonate complexes that are removed from the reaction zone by means of the scandium sorption in the phosphorus-containing ion exchanger, thus, shifting the equilibrium towards the formation of new scandium complexes. The increased sodium carbonate content in the leach solution (more than 50% of $Na_2O$total) results in a partial desorption of scandium sorbed in the ion exchanger and consequently to a decrease in the degree of scandium recovery per ion exchanger. With an increase of the $Na_2O$total concentration above 75 g/dm³ the amount of scandium recovered from red mud decreases due to a partial suppression of the sorption process due to the high salt background in the solution. Moreover, when the concentration of $Na_2O$total is more than the optimal one and the sodium carbonate content is increased, the risk of supersaturation of the leach solution and deposition of sodium bicarbonate crystals in the solid phase becomes higher.

Table 2 shows results of experiments studying the impact of temperatures on scandium capacity in a phosphorous-containing ion exchanger for sorption scandium from a red mud pulp in a phosphorous-containing ion exchanger, where the concentration $Na_2O$total in a carbonate-bicarbonate solution (percentage of $Na_2O$bicarb is 80%) is 65 g/dm³, the contact time is 2 hours, the solid/liquid ratio is 1:4 and the mass ration of the pulp to ion exchanger is 90:1.

TABLE 2

|  | Temperature, ° C. | | | | |
|---|---|---|---|---|---|
|  | 25 | 40 | 60 | 80 | 90 |
| Sc capacity in an ion exchanger, % | 0.11 | 0.19 | 0.26 | 0.31 | 0.33 |

As can be seen from Table 2, when the temperature rises, the scandium capacity in the phosphorous-containing ion exchanger increases which is associated with an improvement in the kinetic characteristics of the sorption and leaching process. The maximum temperature of the sorption leaching process of 90° C. is a result of the thermal stability temperature of the phosphorous-containing ion exchanger, when the temperature rises above 90° C. the ion exchanger breaks down (elimination of functional phosphorus-containing groups). Thus, the maximum scandium capacity in the ion exchanger of 0.33% is achieved at the temperature of 90° C.

Table 3 shows results of experiments studying the impact of a solid/liquid ratio on the scandium capacity in a phosphorous-containing ion exchanger for sorption leaching from a red mud pulp in a phosphorous-containing ion exchanger, where the concentration of $Na_2O$total in a carbonate-bicarbonate solution (percentage of $Na_2O$bicarb is 80%) is 65 g/dm³, the contact time is 2 hours, the temperature is 80° C. and the mass ration of pulp to ion exchanger is 90:1.

TABLE 3

|  | Solid/liquid ratio | | | | | |
|---|---|---|---|---|---|---|
|  | 1:2 | 1:2.5 | 1:3 | 1:4 | 1:5 | 1:6 |
| Sc capacity in an ion exchanger, % | 0.35 | 0.33 | 0.325 | 0.31 | 0.26 | 0.19 |

The analysis of Table 3 has shown that when the solid/liquid ratio in the leaching pulp decreases the scandium capacity in the ion exchanger rises, at the same time the low solid/liquid ratio makes pulp separation from the ion exchanger difficult because of the viscosity of the pulp;

when the solid/liquid ratio increases the concentration of scandium in the leaching solution decreases, thus, reducing the ion exchanger capacity.

Table 4 represents results of experiments studying the impact of the mass ratio of a pulp and ion exchanger on the degree of scandium recovery from a red mud pulp by sorption leaching, where the $Na_2O_{total}$ concentration in the carbonate-bicarbonate solution (the percentage of $Na_2O_{bicarb}$ is 80%) is 65 g/dm$^3$, the contact time is 2 hours, the solid/liquid ratio is 1:4 and the temperature is 80° C.

TABLE 4

| | Mass ration of a pulp and ion exchanger | | | | | | | |
|---|---|---|---|---|---|---|---|---|
| | 10:1 | 20:1 | 40:1 | 60:1 | 80:1 | 100:1 | 120:1 | 140:1 |
| Recovery degree of Sc, % | 50.1 | 49.8 | 49.3 | 48.1 | 47.9 | 41.2 | 35.6 | 29.2 |

As can be seen from Table 4, the maximum recovery degree of scandium, which is 47.9-50.1%, is in the range of the pulp to ion exchanger ratio of 10-80:1. When the ion exchanger dose decreases below the optimal value (pulp:ion exchanger≥100:1), the recovery degree of scandium is decreased, as the amount of ion exchanger at the stage of leaching reduces which leads to the faster establishing of the equilibrium concentration of scandium in the ion exchanger phase and to stopping reduction of scandium concentration in the pulp liquid phase, therefore the transition of scandium from red mud into a solution is stopped. When the ion exchanger dose increases above the optimal value (pulp: sorbing agent 10-60:1) as the result of larger amounts of ion exchangers in the pulp, the base material (scandium) capacity in the ion exchanger decreases.

Table 5 shows results of experiments studying the impact of the contact time of the pulp with the ion exchanger on the degree of scandium recovery from red mud, where, at the first stage of sorption leaching, the concentration of $Na_2O_{total}$ in a carbonate-bicarbonate solution (percentage of $Na_2O_{bicarb}$ is 80%) is 65 g/dm$^3$, the mass ratio of the pulp and the ion exchanger is 90:1, the solid/liquid ratio is 1:4 and the temperature is 80° C.

TABLE 5

| | Contact time, h | | | | | |
|---|---|---|---|---|---|---|
| | 0.5 | 1 | 2 | 4 | 6 | 8 | 10 |
| Recovery degree of Sc, % | 23.5 | 35.7 | 47.8 | 47.9 | 47.95 | 48.0 | 48.1 |

As can be seen from Table 2, when the contact time of the red mud pulp with the ion exchanger, the degree of scandium recovery increases to 48.1%. When the contact time is above the optimal value, the process performance reduces, when the contact time is lower than the optimal value the degree of scandium recovery goes down due to the failure to achieve the scandium equilibrium in the pulp-ion exchanger system for a short period of time.

Optimal parameters of scandium desorption from a phosphorous-containing ion exchanger were established based on results of experiments comprised in varying a sodium carbonate concentration in a desorption solution.

To desorb scandium from the phosphorous-containing ion exchanger a sodium carbonate solution was used, since it effectively desorbs scandium from an ion exchanger surface to obtain industrial reclaims having concentrated scandium and doesn't lead to any wastes from any possible return of the solution to the technological process after removal of impurities and scandium therefrom which makes it possible to operate in a closed cycle. For these experiments, a scandium-saturated phosphorous-containing ion exchanger was used with the following composition, in % by weight: 0.46 $Sc_2O_3$, 0.056 $ZrO_2$, 0.53 $TiO_2$, 3.0 $Fe_2O_3$, 0.1 $Al_2O_3$.

Table 6 comprises results of experiments studying the impact of sodium carbonate concentration in a desorbing solution on desorption of scandium and impurities from a phosphorous-containing ion exchanger. The desorption process was carried out at 50° C. in a compressed layer of an ion exchanger at the solution-feed linear speed 0.3 m/h.

TABLE 6

| | Concentration of $Na_2CO_3$, g/dm$^3$ | | | | |
|---|---|---|---|---|---|
| | 150 | 200 | 300 | 400 | 450 |
| Degree of Sc desorption from an ion exchanger, % | 35.1 | 45.2 | 77.5 | 93.1 | 96.0 |
| Concentration of $Sc_2O_3$ in a pregnant solution, mg/dm$^3$ | 87 | 107 | 186 | 249 | 275 |

As can be seen from Table 6, when the concentration of sodium carbonate in the desorbing solution increases the degree of scandium desorption from resin increases as well, and when the scandium oxide concentration in the desorbing solution is 275 mg/dm$^3$ this degree reaches 96% at 450 g/dm$^3$ of $Na_2CO_3$. The upper limit of sodium carbonate concentration in the desorbing solution is defined by the solubility of sodium carbonate at the given temperature; decrease in sodium carbonate concentration below 200 g/dm$^3$ is unpractical due to the low degree of scandium desorption from the ion exchanger and production of a scandium-depleted industrial reclaim which results in the lower quality of the concentrated scandium and higher reagent consumption needed for recycling such solutions to obtain concentrated scandium.

Researches in the field of sorption leaching of scandium from red mud have defined optimal modes for the following process operations:
 a) Preparing a red mud pulp for sorption:
  initial red mud is filtered and repulped with a solution having a mixture of sodium carbonate and sodium bicarbonate where the concentration of $Na_2O_{total}$ is 40-80 g/dm$^3$ and the percentage of $Na_2O_{bicarb}$ is from 50 to 100% of $Na_2O_{total}$;
  a solid/liquid ratio is 1:2,5-5, preferably 1:4;
  prior to sorption, a pulp is heated to 40-90° C., preferably 60-90° C.
 b) Sorption of scandium from a red mud pulp in a phosphorous-containing ion exchanger:
  a continuous countercurrent mode;
  sorption is carried out in the phosphorous-containing ion exchanger;
  the contact time of the ion exchanger with the pulp at each stage is 1-8 hours, preferably 2-3 hours;
  the mass ratio of pulp to ion exchanger is 20-120:1, preferably 60-100:1;
  the process temperature is 40-90° C., preferably 60-90° C.
 c) Desorption of scandium from a phosphorous-containing ion exchanger to obtain an industrial reclaim for concentrated scandium recovery:

desorption is carried out with the use of a solution of $Na_2CO_3$ with a concentration of 200-450 g/dm$^3$ in the relation to $Na_2CO_3$.

d) Aeration of a solution of a mixture of sodium carbonate and sodium bicarbonate obtained after filtering a pulp of a leached red mud to restore the $Na_2O$bicarb to $Na_2O$total ratio of 50-100% and its return to the stage of leaching:

aeration of a gas-air mixture containing $CO_2$;
the process temperature is 15-60° C., preferably 20-30° C.

The process flow scheme for scandium recovery from red mud is shown in FIG. 1 and includes following operations:

filtering the pulp of initial red mud to obtain a red mud cake;

repulping red mud with a solution having a mixture of sodium carbonate and sodium bicarbonate with a concentration of $Na_2O$total of 40-80 g/dm$^3$ to obtain the red mud pulp ready for leaching:

sorption leaching of scandium from red mud in a phosphorous-containing ion exchanger;

separating the ion exchanger and the depleted in scandium pulp of leached red mud;

desorbing of scandium from the phosphorous-containing ion exchanger with the solution of sodium hydrocarbonate to obtain an industrial reclaim of scandium which is transferred for recovering of the concentrated scandium and a reclaimed ion exchanger transferred for sorbing scandium from a new portion of the red mud pulp;

filtering the depleted in scandium pulp to obtain a cake of leached red mud and a sorption mother solution;

aeration of the sorption mother solution by carbon dioxide to restore the ratio of $Na_2O$carb:$Na_2O$bicarb and transfer thereof for repulping and sorption leaching of a new portion of red mud.

EXAMPLES

The implementation of the claimed method and its advantages over the prototype are confirmed by the following examples.

Example 1

In a reactor of 1 dm$^3$, 300 g of wetted red mud (humidity is 32%) obtained at the stage of filtering the pulp of initial red mud of JSC "SUAL" operating as a subsidiary of "UAZ-SUAL" were repulped by a solution having a mixture of sodium carbonate and sodium bicarbonate with a concentration of $Na_2O$total of 65 g/dm$^3$ (the concentration of $Na_2O$bicarb is 108.4 g/dm$^3$, the concentration of $Na_2O$carb is 42.8 g/dm$^3$) to obtain the solid/liquid ratio of 1:4. Then, during stirring the pulp a swollen phosphorous-containing ion exchanger LewatitTP-260Monoplus in the form of Na$^+$ was added to the pulp in the amount of 10 cm$^3$, after that the pulp was heated to the 80° C.

The solid phase of initial red mud has the following chemical composition, in % by weight: 41.0 $Fe_2O_{3total}$; 13.0 $Al_2O_3$; 7.5 CaO; 13.0 $SiO_2$; 4.50 $TiO_2$; 5.5 $Na_2O$; 0.0140 $Sc_2O_3$; 0.14 $ZrO_2$.

The red mud pulp having the ion exchanger was held in the reactor with stirring during 120 minutes after which the ion exchanger was separated from the pulp on a sieve, washed and analyzed. The pulp was filtered through two layers of Blue ribbon paper, the deposit was washed on a filter with cold distilled water.

Table 7 represents the chemical composition of the washed phosphorous-containing ion exchanger rich in scandium.

TABLE 7

| Element name | Composition of saturated ion exchanger, % | | | | | Specific volume, cm$^3$/g |
|---|---|---|---|---|---|---|
| | $Sc_2O_3$ | $Al_2O_3$ | $Fe_2O_3$ | $TiO_2$ | $ZrO_2$ | |
| Percentage, % | 0.36 | 0.18 | 2.0 | 3.4 | 0.015 | 2.97 |

The degree of scandium recovery at the stage of sorption leaching was 44%.

The sorption mother solution obtained after the leached red mud pulp had been filtered was used to prepare a solution for leaching a new portion of red mud.

Example 2

Washed ion exchanger LewatitTP-260 in the amount of 50 cm$^3$ having the chemical composition shown in Table 8, was transferred for desorbing. For this, from bottom to top the ion exchanger was loaded into an ion exchange column into which a desorbing solution was fed with a concentration of $Na_2CO_3$ of 350 g/dm$^3$, at the same time the temperature in the column was maintained at 50° C.

Upon completion of the desorption process, the ion exchanger was unloaded from the column and washed out from desorbing solution residues, after which it was transferred to the second stage of the sorption leaching of scandium from the red mud pulp.

The industrial reclaim comprising 220 mg/dm$^3$ of scandium oxide was transferred for further processing to recover concentrated scandium.

In such a way, the suggested method for recovering scandium from red mud allows to improve the degree of scandium recovery up to 47% by applying the sorption leaching of scandium in a continuous countercurrent mode at an elevated temperature and to improve the concentrated scandium quality thanks to optimal conditions of scandium desorption from a phosphorous-containing ion exchanger to obtain a rich in scandium industrial reclaim, in addition without involving of additional technical complicated operations.

The invention claimed is:

1. A method for recovering scandium from red mud to obtain a scandium-containing solution suitable for extraction of scandium therefrom including the following steps:

repulping red mud with a mother solution comprising a mixture of sodium carbonate of $Na_2CO_3$ and sodium bicarbonate of $NHCO_3$ to form raw red mud pulp having a solid phase and a liquid phase;

sorption leaching scandium from the raw red mud pulp with a desorbed ion-exchanger without using acidic reagents to obtain a scandium-rich ion exchanger having more scandium compared with the desorbed ion exchanger and a scandium-depleted red mud pulp having a solid phase containing less scandium as compared with the solid phase of the raw red mud pulp, thereby extracting scandium from the red mud solid phase into the liquid phase from which scandium is sorbed on the surface of the desorbed ion exchanger, wherein the ion-exchanger is an ion-exchange resin having phosphorous-containing functional groups, wherein the sorption leaching is carried-out in a countercurrent mode comprising direct contact of the raw red mud pulp with the desorbed ion exchanger by adding the desorbed ion exchanger into the raw red mud pulp without separating the solid phase of the raw red mud pulp from the liquid phase of the raw red mud pulp;

separating the scandium-depleted red mud pulp and the scandium-rich ion exchanger;

filtering the scandium-depleted red mud pulp to obtain a spent mother solution and red mud cake;

desorbing scandium by treating the scandium-rich ion exchanger with a solution of sodium carbonate to obtain the desorbed ion exchanger which is returned to the step of sorption leaching and a scandium-containing solution suitable for extraction of scandium therefrom;

wherein scandium is desorbed from the surface of the ion exchanger by a solution of sodium carbonate with a concentration of 200-450 g/dm$^3$ to obtain the scandium-containing solution.

2. The method of claim 1, characterized in that the mother solution used to repulp the red mud comprises a total concentration of $NaHCO_3$ and $Na_2CO_3$ of 40-80 g/dm$^3$, wherein the $NaHCO_3$ concentration is greater than or equal to 50% of the total of $NaHCO_3$ and $Na_2CO_3$ concentrations.

3. The method of claim 1, characterized in that sorption leaching of scandium is carried out at the temperature of 40-90° C.

4. The method of claim 1, characterized in that sorption leaching of scandium is carried out during 1-8 hours and the ratio of the mass of the raw red mud pulp to the mass of the ion exchanger is 20-120:1.

5. The method of claim 1, characterized in that sorption leaching of scandium is carried out at the mass ratio of the solid and liquid phases in the raw red mud pulp of 1:2.5-5.0 (solid/liquid ratio).

6. The method of claim 1, characterized in that scandium is desorbed from the surface of the ion exchanger by a solution of sodium carbonate with a concentration of $Na_2CO_3$ from 200 to 450 g/dm$^3$.

7. The method of claim 1, further comprising aerating the spent mother solution at a temperature of 15-50° C. with a gas-air mixture containing $CO_2$ to form the mother solution having a $NaHCO_3$ concentration that is greater than or equal to 50% of the total of $NaHCO_3$ and $Na_2CO_3$ concentrations and using at least a portion of the mother solution in the repulping step.

8. The method of claim 1, characterized in that during sorption leaching of scandium from the raw red mud pulp in the phosphorous-containing ion exchanger, the raw red mud pulp is aerated with a gas-air mixture containing $CO_2$.

* * * * *